United States Patent Office 3,463,861
Patented Aug. 26, 1969

3,463,861
COMPOSITIONS AND METHOD OF TREATING MYCOBACTERIUM TUBERCULOSIS WITH 2, 2'-(ETHYLENEDIIMINO)-DI-1-BUTANOLS
Raymond George Wilkinson, Montvale, and Robert Gordon Shepherd, Ridgewood, N.J., assignors to American Cyanamid Company, Stamford, Conn., a corporation of Maine
No Drawing. Continuation-in-part of application Ser. No. 432,423, Feb. 12, 1965. This application Feb. 5, 1968, Ser. No. 702,790
Claims priority, application Great Britain, Feb. 7, 1961, 4,517/61
Int. Cl. A61k 27/00
U.S. Cl. 424—325    10 Claims

ABSTRACT OF THE DISCLOSURE

This disclosure describes compositions of matter useful for the treatment of *Mycobacterium tuberculosis* infections in warm-blooded animals and the method of treating *Mycobacterium tuberculosis* infections in warm-blooded animals therewith, the active ingredients of said compositions of matter being certain unsymmetrically substituted ethylenediamines.

CROSS REFERENCE TO RELATED APPLICATIONS

This application is a continuation-in-part of our co-pending application Ser. No. 432,423, filed Feb. 12, 1965, now abandoned, which is a continuation-in-part of our application Ser. No. 168,241, filed Jan. 23, 1962, now U.S. Patent No. 3,176,040. Applicants claim priority under their British application Ser. No. 4,517 filed Feb. 7, 1961, now British Patent No. 961,317, for all that is disclosed therein which is also disclosed in their application Ser. No. 168,241.

BRIEF SUMMARY OF THE INVENTION

This invention relates to novel compositions of matter useful for the treatment of *Mycobacterium tuberculosis* infections in warm-blooded animals. More particularly, it relates to therapeutic compositions containing certain unsymmetrically substituted ethylenediamines useful for the treatment of *Mycobacterium tuberculosis* infections in warm-blooded animals. The invention includes the new compositions of matter and the method of treating *Mycobacterium tuberculosis* infections in warm-blooded animals therewith.

Our invention is based upon the discovery that certain unsymmetrically substituted ethylenediamines possess excellent activity as anti-mycobacterial agents. The unsymmetrically substituted ethylenediamines of the present invention may be represented by the following general formula:

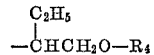

wherein $R_1$ and $R_2$ are each hydrogen, methyl or ethyl; Y is isopropyl, sec-butyl, tert-butyl or

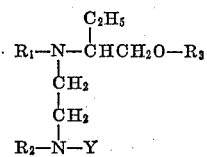

and $R_3$ and $R_4$ are each hydrogen, methyl, ethyl, benzyl or lower alkanoyl; with the proviso that when Y is $$-\overset{C_2H_5}{\underset{|}{C}}HCH_2O-R_4$$

then the substituted ethylenediamine must be unsymmetrically substituted. Suitable lower alkanoyl groups are those having from 1 to 4 carbon atoms such as, for example, formyl, acetyl, propionyl, etc.

DETAILED DESCRIPTION OF THE INVENTION

The unsymmetrically substituted ethylenediamines of the present invention form non-toxic acid-addition salts with a variety of organic and inorganic salt-forming reagents. Thus, acid-addition salts, formed by admixture of the ethylenediamine base with an acid, suitably in a neutral solvent, are formed with such acids as sulfuric, phosphoric, hydrochloric, hydrobromic, citric, lactic, tartaric, acetic and related acids. For purposes of this invention, the unsymmetrically substituted ethylenediamines are equivalent to their non-toxic acid-addition salts.

The unsymmetrically substituted ethylenediamines of the present invention may be readily prepared by the various methods described herein and also by the method set forth in U.S. Patent No. 2,913,496 to Cluff. The O-methyl derivatives of N-[N'-(lower alkyl)β-aminoethyl]-β-ethyl-β-aminoethanol may be readily prepared by using the general procedure of sodium salt formation by means of sodium hydride, as in Example 3, and methyl iodide or dimethyl sulfate as methylating agents. To obtain the ethyl ether analogues, ethyl iodide is employed. The N-methyl derivatives may be obtained by condensation of 2-methyl-amino-1-butanol with β-(lower alkylamino) ethyl chloride hydrochloride as illustrated for the ethyl derivative of Example 2. The isomeric N-methyl compounds may be obtained by reacting 2-aminobutanol with N-alkyl-N-methyl-β-aminoethyl chloride hydrochloride. The O-benzyl derivatives may be readily obtained by treating an appropriate β-hydroxyethyl ethylenediamine sodium salt with benzyl chloride, as illustrated in Example 11.

The unsymmetrically substituted ethylenediamines of the present invention are active against *Mycobacterium tuberculosis* H37Rv infections in mice when tested in accordance with the following procedure. Carworth Farms CF1 white mice, females, 4 to 6 weeks old, weighing 17 to 22 grams, are infected with *Mycobacterium tuberculosis* H37Rv by administration intravenously of 0.2 ml. of a buffered saline suspension containing approximately 1.5 mg. per ml. wet weight of a 12 to 14 day culture of the test organism grown on Sauton's agar medium. Routinely, 200–300 mice are given this standard infection and then segregated in a random manner into cages each of which holds five or ten mice. Four groups of five mice each are retained as untreated controls, and the remaining mice are used to ascertain activity of compounds under test. During a one year experience with this test, the standard infection defined above caused a 99.5% mortality, in that 756 of the 760 infected untreated control mice died within 30 days, the normal period of the test.

A measured amount of each compound to be tested is administered orally incorporated in a standard diet to groups of infected mice for 14 days, after which the mice are fed untreated standard diet. Control animals receive untreated standard diet for the entire test period and all animals are allowed to feed at will. Tests are terminated at 30 days or at 60 days after the day of infection. A compound is judged active if it either saves 2 or more of the 5 mice in a test group or prolongs average survival time by 4 or more days compared to untreated controls.

The standard diet used in this test procedure is a commercial feed designed for laboratory mice and rats and is sold under the trademark Wayne Lab-Blox® by Allied Mills, Inc., Chicago, Ill. The ingredients of this commercial feed are animal liver meal, beef meal, fish meal, breiver's yeast, condensed fish solubles, soybean oil meal, ground yellow corn, wheat bran, dehydrated alfalfa meal, linseed oil meal, oat meal, wheat germ meal, dried whey, soybean oil, riboflavin supplement, sardine oil with added Vitamin A and D concentrate, irradiated yeast, iodized salt, calcium carbonate, copper sulfate, bone meal, iron oxide, cobalt carbonate, manganese sulfate and animal protein factor supplement. In the test procedure described hereinabove, the standard diet into which measured amounts of test compounds had been homogeneously incorporated was administered to infected test animals, whereas untreated standard diet was given to infected control animals.

In a representative operation, and merely by way of illustration, the following compounds of the present invention are active in this test procedure at the indicated oral dose as set forth in Table I and Table II below:

TABLE I.—ALIVE/TOTAL MICE TESTED 60 DAYS AFTER INFECTION

| Percent compound in diet | A | B | C |
| --- | --- | --- | --- |
| 0.2 | 20/20 | 20/20 | |
| 0.1 | 49/50 | 17/20 | 25/30 |
| 0.05 | 41/50 | 15/20 | 35/40 |
| 0.025 | 18/50 | 10/20 | 26/40 |
| 0.012 | 5/50 | 3/20 | 19/40 |
| 0.006 | 0/50 | 0/20 | 3/40 |
| 0.003 | | | 1/30 |

Infected, non-treated controls: 140/140 mice died with an average survival time of 18 days.

(A) N-[N' - (isopropyl) - β - aminoethyl]-β-ethyl-β-aminoethanol.
(B) d-2-(tert.-butylaminoethylamino)-1-butanol.
(C) d-2-(sec.-butylaminoethylamino)-1-butanol.

TABLE II.—ALIVE/TOTAL MICE TESTED 30 DAYS AFTER INFECTION

| Percent compound in diet | D | E | F |
| --- | --- | --- | --- |
| 0.4 | 8/10 | | 4/5 |
| 0.2 | 3/5 | | 4/5 |
| 0.1 | 0/5 | 5/5 | 4/5 |
| 0.05 | | 13/15 | 13/15 |
| 0.025 | | 10/15 | 10/10 |
| 0.012 | | 9/10 | 7/10 |
| 0.006 | | 0/10 | 3/10 |

Infected, non-treated controls: 100/100 mice died with an average survival time of 19 days.

(D) N-ethyl-N-[N'-(isopropyl)-β-aminoethyl]-β-ethyl-β-aminoethanol.
(E) N-[N'-(α-ethyl-β-methoxyethyl)-β-aminoethyl]-β-ethyl-β-aminoethanol.
(F) N-[N'-(α-ethyl-β-ethoxyethyl)-β - aminoethyl]-β-ethyl-β-aminoethanol.

The unsymmetrically substituted ethylenediamines and their non-toxic acid-addition salts of the present invention have thus been found to be highly useful for the treatment of *Mycobacterium tuberculosis* infections in warm-blooded animals when administered in amounts ranging from about 5 mg. to about 200 mg. per kg. of body weight per day. A preferred dosage regimen for optimum results would be from about 10 mg. to about 100 mg. orally per kg. of body weight per day, and such dosage units are employed that a total of from about 0.5 g. to 10.0 g. of active ingredient for a subject of about 70 kg. are administered orally in a 24 hour period.

The dosage units of active compound may contain other inert or medically active materials, for instance, when the dosage unit form is a tablet, pill or granules, there may also be present various binders, fillers or solid diluents. Suitable materials for this purpose may be, for example, starch such as corn starch, or sugar such as lactose or sucrose. There may also be present various medically active materials, for example, p-amino salicylic acid. When the dosage unit form is a capsule, it may contain in addition to materials of the above type a liquid carrier such as a fatty oil. The dosage unit form may also have present various flavors, oil of wintergreen, and excipients such as dicalcium phosphate. Various other materials may be present as coatings or to otherwise modify the physical form of the dosage unit, for instance, pills or capsules may be coated with shellac, sugar or both. Of course, any material used in preparing the dosage unit form should be pharmaceutically pure and substantially non-toxic in the amounts employed.

The following examples illustrate the preparation of typical unsymmetrically substituted ethylenediamines of the present invention.

EXAMPLE 1

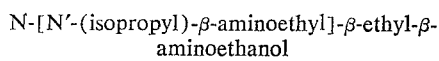

N-[N'-(isopropyl)-β-aminoethyl]-β-ethyl-β-aminoethanol

A mixture of 15.8 g. (0.1 mole) of β-isopropylaminoethylchloride hydrochloride and 35.6 g. (0.4 mole) of 2-aminobutanol is heated at reflux for 4 hours. The cooled viscous oil is treated with 100 ml. of 10 N NaOH and the organic layer extracted into benzene. The combined extracts are dried over anhydrous $Na_2CO_3$, concentrated, and the residue is distilled. The first fraction collected consists of 2-aminobutanol, B.P. 80–85° C./15 mm. Further distillation yields the product as a light yellow oil, 11 g., B.P. 85–86° C./0.005 mm.

EXAMPLE 2

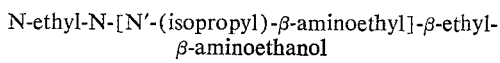

N-ethyl-N-[N'-(isopropyl)-β-aminoethyl]-β-ethyl-β-aminoethanol

A mixture of 25 g. (0.21 mole) of 2-ethylamino-1-butanol and 11.1 g. (0.07 mole) of β-isopropylaminoethyl chloride hydrochloride is heated to 180° C. After 20 minutes of heating a vigorous reaction ensues and the solution turns a deep red. The mixture is refluxed for an additional 18 hours after which the cooled viscous liquid is treated with ca. 30 ml. 10 N NaOH. The insoluble oil is extracted into benzene followed by several successive extractions of the aqueous layer with benzene. The combined extracts are dried over anhydrous $Na_3CO_3$. The benzene solution is concentrated and the residue distilled under reduced pressure to remove excess 2-ethylamino-1-butanol; B.P. 75–85° C./15 mm. Further distillation at 0.03 mm. affords 7 g. of the desired product, a pale yellow liquid B.P. 82–83° C.

EXAMPLE 3

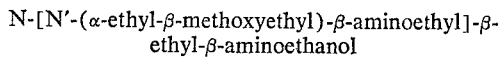

N-[N'-(α-ethyl-β-methoxyethyl)-β-aminoethyl]-β-ethyl-β-aminoethanol

To a solution of 22.4 g. of dextro 2,2'-(ethylenediimino)-di-1-butanol in 200 ml. of t-butanol is added a suspension of 2.64 g. of sodium hydride in 25 ml. of ether and the reaction mixture is heated to reflux for 1 hour whereby a clear solution is obtained. This is cooled to 35° C. with some solid forming. Dropwise addition of a solution of 15.1 g. of methyl iodide in 25 ml. of t-butanol causes some temperature rise and a clearing of the solution. The solution is refluxed for 18 hours and the solvent removed under vacuum. Addition of 80 ml. of 6 N hydrochloric acid gives a deep red solution which is extracted with benzene. The aqueous phase is made strongly alkaline with sodium hydroxide causing separation of a red oil. Extraction with benzene followed by drying with anhydrous sodium carbonate and distillation gives a fraction, B.P. 180–186° C./12 mm.

EXAMPLE 4

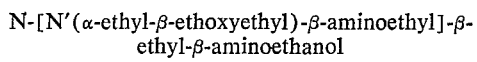

N-[N'(α-ethyl-β-ethoxyethyl)-β-aminoethyl]-β-ethyl-β-aminoethanol

The procedure of Example 3 is repeated substituting an equimolar amount of ethyl iodide for the methyl iodide employed in that example. There is thus obtained two fractions on distillation. The lower boiling fraction is dextro N,N' - bis - (α - ethoxymethylpropyl)ethylenediamine, B.P. 157–160° C./8 mm. The higher boiling fraction is dextro N-[N'-(α-ethyl-β-ethoxyethyl)-β-aminoethyl]-β-ethyl-β-aminoethanol, B.P. 168–175° C./8 mm.

EXAMPLE 5

N-methyl-N,N'-bis(α-hydroxymethylpropyl)ethylenediamine

To 20.4 g. of 2,2'-(ethylenediimino)-di-1-butanol and 20 ml. of t-butanol is added 14.1 g. of methyl iodide and the mixture is refluxed for 18 hours. The reaction mixture is added to excess dry hydrochloric acid in acetone-ethanol to precipitate the white dihydrochloride of the N-methylated derivative.

EXAMPLE 6

N,N'-dimethyl-N-[N'-(α-ethyl-β-methoxyethyl)-β-aminoethyl]-β-ethyl-β-aminoethanol A solution of 4.1 g. of dl-2,2'-(ethylenediimino)-di-1-butanol in 20 ml. of hot toluene is added dropwise to a suspension of 0.76 g. of sodium hydride in 5 ml. of toluene, the temperature being kept at 100° C. After stirring this mixture for several hours at room temperature a solution of 9.5 g. of methyl iodide in 5 ml. of toluene is added slowly, keeping the temperature below 50° C. The resulting mixture is treated with water and the toluene layer separated. The water-layer is extracted several times with methylene chloride and the combined extracts (toluene and $CH_2Cl_2$) dried over anhydrous sodium carbonate and concentrated to 50 ml. The concentrate is extracted with dilute hydrochloric acid. The extract is basified, and the insoluble organic layer is extracted into $CH_2Cl_2$. The extract is dried over anhydrous $Na_2CO_3$, concentrated and the residue is distilled under reduced pressure to give a pale yellow liquid B.P. 90–95° C./0.01 mm. By elemental analyses, by O-methyl and N-methyl analyses, and by vapor phase chromatography [on a tetrakis(hydroxyethyl)ethylenediamine column at 130° C.], the presence of the N,N',O-trimethyl derivative is demonstrated to have been formed along with some of the N,N',O,O'-tetramethyl derivative.

EXAMPLE 7

N-methyl-N,N'-bis(α-methoxymethylpropyl)ethylenediamine

Sodium hydride (1.44 g.) is added to 25 ml. of ether, followed by addition of 100 ml. of t-butanol and moderate exothermic reaction results. A solution of 6.12 g. of dl-2,2'-(ethylenediimino)-di-1-butanol in 50 ml. of t-butanol is added to the solution, with stirring, and the mixture is refluxed for one hour. A solution of 12.8 g. of methyl iodide in 25 ml. of t-butanol is added slowly to the cooled solution giving a clear solution which was then refluxed for 7½ hours. Methanol (25 ml.) is added and the cloudy solution filtered. The filtrate is concentrated to ca. 15 ml. and benzene is added. The inorganic salts are removed by filtration and the benzene filtrate is evaporated on the steam bath under an air jet. By means of elemental and functional group analyses and by vapor phase chromatography [using a tetrakis(hydroxyethyl)ethylenediamine column at 130° C.], the N,O,O'-trimethyl derivative is shown to have been formed along with some O,O'-dimethyl derivative.

EXAMPLE 8

O-methyl-N-[N'-(isopropyl)-β-aminoethyl]-β-ethyl-β-aminoethanol

By using N - [N' - (isopropyl)-β-aminoethyl]-β-ethyl-β-aminoethanol in the procedure of Example 3, its O-methyl derivative is obtained.

EXAMPLE 9

N,N'-dimethyl-N-[N'-(α-ethyl-β-acetoxyethyl)-β-aminoethyl]-β-ethyl-β-aminoethanol To 4.64 g. of N,N' - dimethyl - N,N' - bis(α - hydroxymethylpropyl)ethylenediamine in 25 ml. of benzene is added 2.04 g. of acetic anhydride. After the exothermic reaction has subsided, the reaction mixture is added to excess oxalic acid in ether to precipitate the oxalate of the acetylated derivative.

EXAMPLE 10

N,N'-dimethyl-N-[N'-(α-ethyl-β-formyloxyethyl)-β-aminoethyl]-β-ethyl-β-aminoethanol To 102.8 g. of 98% formic acid is added 56.0 g. of dl - 2,2' - (ethylenediimino)-di-1-butanol, portionwise and with cooling. Then, 24.5 g. of 37% formaldehyde is added and the solution heated on the steam bath with evolution of $CO_2$. When the effervescene subsides somewhat, another 24.5 g. of 37% formaldehyde is added and the solution is heated on the steam bath overnight. The mixture is concentrated by heating under reduced pressure. The concentrate is treated in the cold with 100 ml. of 10 N NaOH in which is dissolved some additional NaOH pellets. The mixture is extracted with several portions of benzene, and the combined benzene extracts are dried over anhydrous $Na_2CO_3$ and concentrated. The residual oil is distilled under reduced pressure, B.P. 145–148° C./0.05 mm. Elemental analyses and infrared absorption spectrum demonstrate the formyl ester grouping.

EXAMPLE 11

N - [N' - (α - ethyl - β - benzyloxyethyl) - β - aminoethyl] - β-ethyl-β-aminoethanol, N,N'-dibenzyl-N-[N'-(α - ethyl-β-benzyloxyethyl)-β-amino]-β-ethyl-β-aminoethanol and N - benzyl-N,N'-bis(α-benzyloxymethylpropyl)ethylenediamine To 16.34 g. of dextro 2,2' - (ethylenediimino) - di - 1 - butanol in 200 ml. of t-butanol is added 3.84 g. of sodium hydride in 50 ml. of ether and the mixture is refluxed for one hour. Benzyl chloride (18.99 g.) is added and the mixture is refluxed for 18 hours. After the solvent is evaporated under vacuum, the mixture is made strongly alkaline and extracted with benzene. Distillation of the extract affords three major fractions: (1) the O-benzyl derivative, B.P. 205–215° C./0.12 mm.; (2) the O,O'-dibenzyl derivative, B.P. 215–225° C./0.12 mm.; and (3) a mixture of the N,N',O-tribenzyl and N,O,O'-tribenzyl derivatives, B.P. 230–250° C./0.12 mm.

EXAMPLE 12 d-2-(sec.-butylaminoethylamino)-1-butanol

A mixture of 51.6 g. (0.3 mole) of sec.-butylaminoethylchloride hydrochloride and 106.8 g. (1.2 mole) of d-2-aminobutanol was heated at reflux for 5 hours. The cooled solution was treated with 80 ml. 10 N NaOH and the aqueous layer extracted with 4×50 ml. benzene. The extract was dried over anhydrous $Na_2CO_3$ and concentrated to a viscous oil. Distillation gave a fraction (1) B.P. 80–84° C./13–15 mm., 2-aminobutanol, and a higher boiling fraction (2) B.P. 90–100° C./0.2 mm. Redistillation of the latter gave the desired diamine as a colorless liquid B.P. 98–100° C./0.1 mm.

EXAMPLE 13 d-2-(tert-butaylaminoethylamino)-1-butanol

A mixture of 42.0 g. (0.24 mole) of tert.-butylaminoethylchloride hydrochloride and 85.5 g. (0.96 mole) of d-2-aminobutanol was heated at reflux for 5 hours. The cooled mixture was treated with 60 ml. of 40% NaOH and extracted into ethyl acetate (4×75 ml.). On standing the ethyl acetate extract separated into two phases which were then backwashed with water. The aqueous washings were extracted with $CHCl_3$ (2×25 ml.). The combined ethyl acetate and chloroform extracts were dried over anhydrous $Na_2CO_3$ and concentrated in vacuo. When half the solvent was evaporated inorganic salts precipitated and were removed by filtration. The filtrate was concentrated further and the residual viscous oil distilled at reduced pressure to give 2-aminobutanol, B.P. 88–90° C./15 mm., and a higher boiling fraction, B.P. 85–95° C./0.1 mm., $n_D^{25}$ 1.461. Treatment with excess ethanolic HCl and dilution with ether yielded on standing the dihydrochloride salt as white crystals, M.P. 157.5–159.5° C.

We claim:

1. A therapeutic composition in oral dosage unit form useful for the treatment of *Mycobacterium tuberculosis* infections in warm-blooded animals comprising from 0.5 gram to 10.0 grams per daily dosage unit of a compound selected from the group consisting of those of the formula:

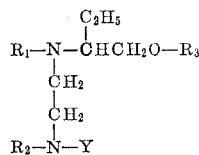

wherein $R_1$ is selected from the group consisting of hydrogen, methyl and ethyl, $R_2$ is selected from the group consisting of hydrogen, methyl and ethyl, Y is selected from the group consisting of iso-propyl, sec.-butyl, tert.-butyl and

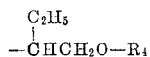

$R_3$ is selected from the group consisting of hydrogen, methyl, ethyl, benzyl and lower alkanoyl, and $R_4$ is selected from the group consisting of hydrogen, methyl, ethyl, benzyl and lower alkanoyl, with the proviso that when Y is

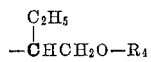

then the compound is unsymmetrically substituted, and the non-toxic acid-addition salts thereof; and an edible carrier.

2. A composition according to claim 1 wherein $R_1$, $R_2$ and $R_3$ are hydrogen and Y is isopropyl.

3. A composition according to claim 1 wherein $R_1$, $R_2$ and $R_3$ are hydrogen and Y is sec.-butyl.

4. A composition according to claim 1 wherein $R_1$, $R_2$ and $R_3$ are hydrogen, Y is

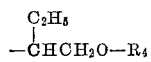

and $R_4$ is methyl.

5. A composition according to claim 1 wherein $R_1$, $R_2$ and $R_3$ are hydrogen, Y is

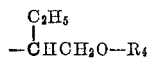

and $R_4$ is ethyl.

6. The method of treating *Mycobacterium tuberculosis* infections in warm-blooded animals which consists in administering orally to said warm-blooded animals an effective amount of a compound selected from the group consisting of those of the formula:

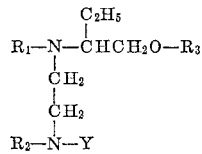

wherein $R_1$ is selected from the group consisting of hydrogen, methyl and ethyl, $R_2$ is selected from the group consisting of hydrogen, methyl and ethyl, Y is selected from the group consisting of iso-propyl, sec.-butyl, tert.-butyl and

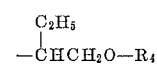

$R_3$ is selected from the group consisting of hydrogen, methyl, ethyl, benzyl and lower alkanoyl, and $R_4$ is selected from the group consisting of hydrogen, methyl, ethyl, benzyl and lower alkanoyl, with the proviso that when Y is

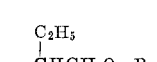

then the compound is unsymmetrically substituted, and the non-toxic acid-addition salts thereof.

7. The method according to claim 6 wherein $R_1$, $R_2$ and $R_3$ are hydrogen and Y is isopropyl.

8. The method according to claim 6 wherein $R_1$, $R_2$ and $R_3$ are hydrogen and Y is sec.-butyl.

9. The method according to claim 6 wherein $R_1$, $R_2$ and $R_3$ are hydrogen, Y is

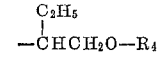

and $R_4$ is methyl.

10. The method according to claim 6 wherein $R_1$, $R_2$ and $R_3$ are hydrogen, Y is

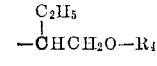

and $R_4$ is ethyl.

References Cited

UNITED STATES PATENTS

| | | | |
|---|---|---|---|
| 3,176,040 | 3/1965 | Wilkinson et al. | 167—65 |
| 3,268,576 | 8/1966 | Wilkinson et al. | 167—65 |
| 3,271,450 | 9/1966 | Wilkinson et al. | 167—65 |

ALBERT T. MEYERS, Primary Examiner

J. D. GOLDBERG, Assistant Examiner

U.S. Cl. X.R.

424—330